United States Patent
Zhang et al.

(10) Patent No.: US 12,013,507 B2
(45) Date of Patent: Jun. 18, 2024

(54) INCREASING RESOLUTION OF SUBSURFACE INVERSION

(71) Applicant: Chevron U.S.A. Inc., San Ramon, CA (US)

(72) Inventors: Zhao Zhang, Houston, TX (US); Yijie Zhou, Houston, TX (US); Sandra C. Saldana, Houston, TX (US); David Bradly Christensen, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 240 days.

(21) Appl. No.: 17/556,002

(22) Filed: Dec. 20, 2021

(65) Prior Publication Data

US 2023/0194737 A1    Jun. 22, 2023

(51) Int. Cl.
*G01V 1/28* (2006.01)
*G01V 1/30* (2006.01)

(52) U.S. Cl.
CPC .......... *G01V 1/282* (2013.01); *G01V 1/306* (2013.01); *G01V 2210/614* (2013.01)

(58) Field of Classification Search
CPC ... G01V 1/282; G01V 1/306; G01V 2210/614
See application file for complete search history.

(56) References Cited

U.S. PATENT DOCUMENTS

| | | | | |
|---|---|---|---|---|
| 9,207,351 | B2 * | 12/2015 | Dickens | ................. G01V 3/083 |
| 2019/0064377 | A1 | 2/2019 | Albertin | |
| 2020/0088896 | A1 | 3/2020 | Schmedes | |
| 2020/0183035 | A1 | 6/2020 | Liu | |
| 2021/0103063 | A1 | 4/2021 | Padhi | |

OTHER PUBLICATIONS

Feng et al., 'Multi-scale Data-Driven Seismic Full-Waveform Inversion with Field Data Study', Oct. 1, 2021, IEEE Publication, vol. 60, 2022, pp. 1-14 (Year: 2021).*
Aaron van den Oord, Sander Dieleman, Heiga Zen, Karen Simonyan, Oriol Vinyals, Alex Graves, Nal Kalchbrenner, Andrew Senior, and Koray Kavukcuoglu, "WaveNet: A generative model for raw audio, "arXiv preprint arXiv:1609.03499, 2016.
Zeyu Jin, Adam Finkelstein, Gautham J. Mysore, and Jingwan Lu, "FFTNet: a real-time speaker-dependent neural vocoder," in Proc. ICASSP, 2018.
Mohebali, Behshad; Tahmassebi, Amirhessam; Meyer-Baese, Anke; Gandomi, Amir H. (2020). Probabilistic neural networks: a brief overview of theory, implementation, and application. Elsevier. pp. 347-367.
Ke Wang, Laura Bandura, Dimitri Bevc, Shuxing Cheng, Jim DiSiena, Adam Halpert, Konstantin Osypov, Bruce Power, and Ellen Xu (2019). End-to-end deep neural network for seismic inversion.

(Continued)

*Primary Examiner* — Elias Desta
(74) *Attorney, Agent, or Firm* — Esplin & Associates, PC

(57) ABSTRACT

A neural network is utilized to improve the resolution of subsurface inversion. The neural network leverages posterior distribution of samples and adds high frequency components to the inversion by utilizing the data in both the time domain and the frequency domain. The improved resolution of the subsurface inversion enables more accurate prediction of subsurface characteristics (e.g., reservoir architecture).

18 Claims, 5 Drawing Sheets

(56) References Cited

OTHER PUBLICATIONS

PCT International Search Report and Written Opinion for PCT Application No. PCT/US2022/052737) mailed Mar. 28, 2023 (14 pages).
Zerafa el al., Learning lo Invert Pseudo-Spectral Data for Seismic Waveform Inversion. 21 Nov. 8-10, 2019 (Nov. 21, 2019). [retrieved on Feb. 28, 2023]. Retrieved from the Internet: <URL: https://arxiv.org/pdf/1911.09549.pdf> pp. 1-16.

* cited by examiner

INCREASING RESOLUTION OF SUBSURFACE INVERSION

FIELD

The present disclosure relates generally to the field of improving resolution of subsurface inversion.

BACKGROUND

Inversion may be performed on seismic data to identify subsurface characteristics. Low resolution of the seismic data may result in errors in inversion results. For example, low resolution of the seismic data may result in errors in identifying geometry (e.g., top, base, size) of a reservoir.

SUMMARY

This disclosure relates to improving resolution of subsurface inversion. Seismic reflection information and/or other information may be obtained. The seismic reflection information may define seismic reflection response in a subsurface region. Seismic characteristic information may be generated based on subsurface inversion of the seismic reflection information and/or other information. The seismic characteristic information may define subsurface characteristics of the subsurface region at a first resolution. Improved seismic characteristic information may be generated based on inputting the seismic characteristic information in a neural network and/or other information. The neural network may output the improved seismic characteristic information. The improved seismic characteristic information may define the subsurface characteristics of the subsurface region at a second resolution higher than the first resolution.

A system for improving resolution of subsurface inversion may include one or more electronic storage, one or more processors and/or other components. The electronic storage may store seismic reflection information, information relating to seismic reflection response in a subsurface region, seismic characteristic information, information relating to subsurface characteristics of the subsurface region, information relating to subsurface inversion, improved seismic characteristic information, information relating to neural network, and/or other information.

The processor(s) may be configured by machine-readable instructions. Executing the machine-readable instructions may cause the processor(s) to facilitate improving resolution of subsurface inversion. The machine-readable instructions may include one or more computer program components. The computer program components may include one or more of a seismic reflection component, a seismic characteristic component, an improved seismic characteristic component, and/or other computer program components.

The seismic reflection component may be configured to obtain seismic reflection information and/or other information. The seismic reflection information may define seismic reflection response in a subsurface region.

The seismic characteristic component may be configured to generate seismic characteristic information and/or other information. The seismic characteristic information may be generated based on subsurface inversion of the seismic reflection information and/or other information. The seismic characteristic information may define subsurface characteristics of the subsurface region at a first resolution.

The improved seismic characteristic component may be configured to generate improved seismic characteristic information and/or other information. The improved seismic characteristic information may be generated based on inputting the seismic characteristic information and/or other information in a neural network. The neural network may output the improved seismic characteristic information and/or other information. The improved seismic characteristic information may define the subsurface characteristics of the subsurface region at a second resolution higher than the first resolution.

In some implementations, the improved seismic characteristic information having the second resolution higher than the first resolution of the seismic characteristic information may include: (1) the seismic characteristic information defining the subsurface characteristics of the subsurface region at hundreds of feet; and (2) the improved seismic characteristic information defining the subsurface characteristics of the subsurface region at tens of feet.

In some implementations, the neural network may integrate frequency domain information into the seismic characteristic information to output the improved seismic characteristic information that has higher resolution.

In some implementations, the neural network may be FFTNet. In some implementations, the FFTNet may be trained using inversion data and well log. The inversion data and the well log may be paired for training of the FFTNet based on location and/or other information. The FFTNET may utilize both time domain information and frequency domain information to increase resolution of the subsurface characteristics.

In some implementations, geometry of the subsurface region may be determined based on the improved seismic characteristic information and/or other information. In some implementations, the geometry of the subsurface region may be determined deterministically based on the improved seismic characteristic information.

In some implementations, the subsurface region may include a reservoir, and the geometry of the reservoir determined based on the improved seismic characteristic information may include top, base, and size of the reservoir. In some implementations, the geometry of the reservoir determined based on the improved seismic characteristic information may further include layer types and layer locations within the reservoir.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to improving resolution of subsurface inversion. A neural network is utilized to improve the resolution of subsurface inversion. The neural network leverages posterior distribution of samples and adds high frequency components to the inversion by utilizing the data in both the time domain and the frequency domain. The improved resolution of the subsurface inversion enables more accurate prediction of subsurface characteristics (e.g., reservoir architecture).

Figure 1:
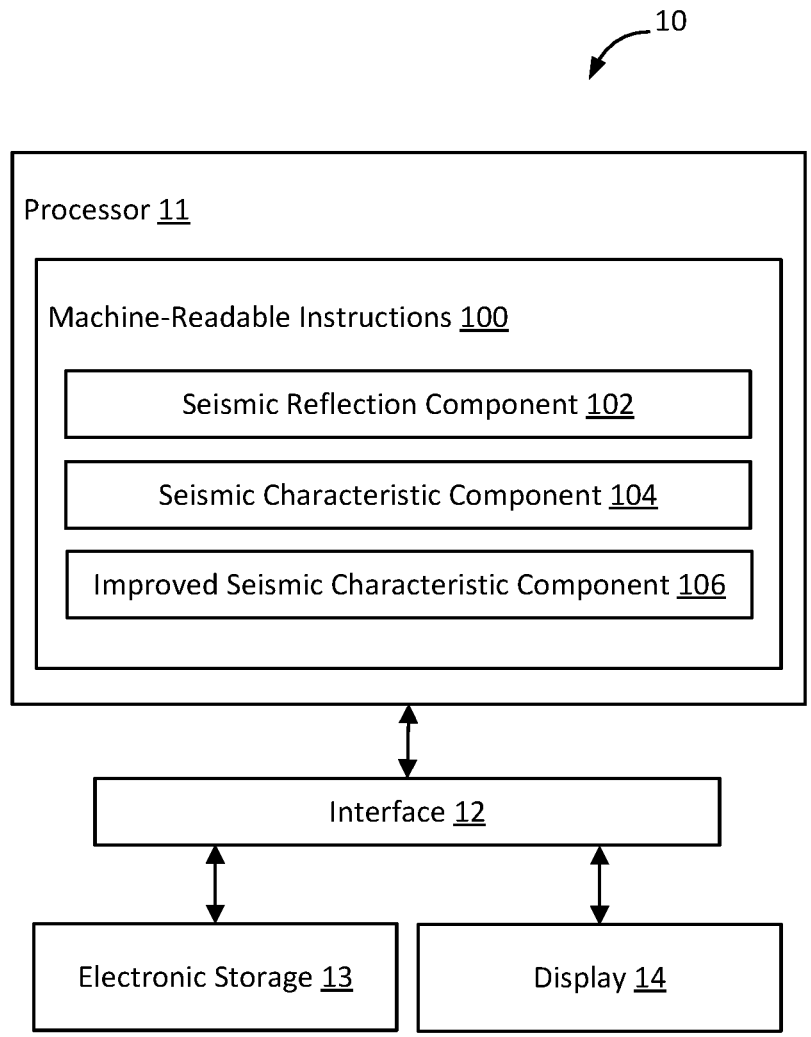
FIG. 1 illustrates an example system for improving resolution of subsurface inversion.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a display 14, and/or other components. Seismic reflection information and/or other information may be obtained by the processor 11. The seismic reflection information may define seismic reflection response in a subsurface region. Seismic characteristic information may be generated by the processor 11 based on subsurface inversion of the seismic reflection information and/or other information. The seismic characteristic information may define subsurface characteristics of the subsurface region at a first resolution. Improved seismic characteristic information may be generated by the processor 11 based on inputting the seismic characteristic information in a neural network and/or other information. The neural network may output the improved seismic characteristic information. The improved seismic characteristic information may define the subsurface characteristics of the subsurface region at a second resolution higher than the first resolution.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store seismic reflection information, information relating to seismic reflection response in a subsurface region, seismic characteristic information, information relating to subsurface characteristics of the subsurface region, information relating to subsurface inversion, improved seismic characteristic information, information relating to neural network, and/or other information.

The display 14 may refer to an electronic device that provides visual presentation of information. The display 14 may include a color display and/or a non-color display. The display 14 may be configured to visually present information. The display 14 may present information using/within one or more graphical user interfaces. For example, the display 14 may present seismic reflection information, information relating to seismic reflection response in a subsurface region, seismic characteristic information, information relating to subsurface characteristics of the subsurface region, information relating to subsurface inversion, improved seismic characteristic information, information relating to neural network, and/or other information.

Seismic data for a subsurface region may be acquired in the time domain by measuring seismic reflection response in the subsurface region. Characteristics of materials (e.g., rocks, etc.) in the subsurface region may be derived by performing subsurface inversion on the seismic data. Seismic data may be calibrated using well log data for the subsurface region. However, differences in data acquisition parameters and bandwidth between the seismic data and well log data results in seismic data having much lower resolution than the well log data. For example, while the well log data may provide information at half-a-foot resolution, the seismic data may provide information at resolution of hundreds of feet. Additionally, subsurface inversion using seismic data focus on the information in the time domain and ignores the higher resolution capabilities of data in the frequency domain.

The low resolution of the seismic data and subsurface inversion may result in the subsurface characteristics being derived at low resolution, which may in turn lead to errors in modeling the subsurface region (e.g., modeling reservoir architecture, such as geometry and composition of layers inside a reservoir). For example, use of low-resolution subsurface characteristics derived from traditional subsurface inversion may result in errors in modeling the location of top, base, and size of a conventional reservoir.

A geostatistical inversion may be used to increase the resolution of the information. For example, a geostatistical inversion may run multiple realizations of the subsurface inversion to determine the most likely size of the reservoir. But while the geostatistical inversion may result in determination of the most probable size of the reservoir, the geostatistical inversion may not provide accurate understanding of the reservoir architecture. A lack of proper understanding of the reservoir architecture may result in costly problems during development of the reservoir and may necessitate drilling of potentially unproductive wells in the reservoir.

Additionally, traditional subsurface inversion techniques may rely on a convolutional model to invert rock's reflectivity and impedance from the seismic data. Typically, only the stronger signal with lower frequency is utilized in the inversion. High frequency information in the seismic data, due to its weak amplitude and high level of noise contamination, is often overlooked by subsurface inversion techniques or categorized as noise and removed during processing.

The present disclosure provides a tool to increase the resolution of subsurface inversion, which enables more accurate modeling of subsurface regions. The present disclosure combines both physical and data driven approaches to subsurface inversion by leveraging the historical strengths of the time series seismic inversion with the predictive power of machine learning. Machine learning approach is used to extrapolate the high frequency information from the seismic data and use the combination of frequency-domain and time-domain information to increase the resolution of subsurface inversion. For instance, the present disclose may be used to improve the resolution of subsurface inversion by an order of magnitude (e.g., increase resolution of subsurface characteristics from being defined at hundreds of feet to being defined at tens of feet). Such increase in resolution may enable accurate modeling of the reservoir interior architecture. Additionally, the inclusion of the frequency-domain information in the subsurface inversion may reveal subsurface characteristics that are invisible in a time-domain analysis. For example, the top of a reservoir may be transparent to subsurface inversion performed in the time-domain. Inclusion of the frequency-domain information in the subsurface inversion may allow for the top of the reservoir to be accurately identified.

Figure 3:
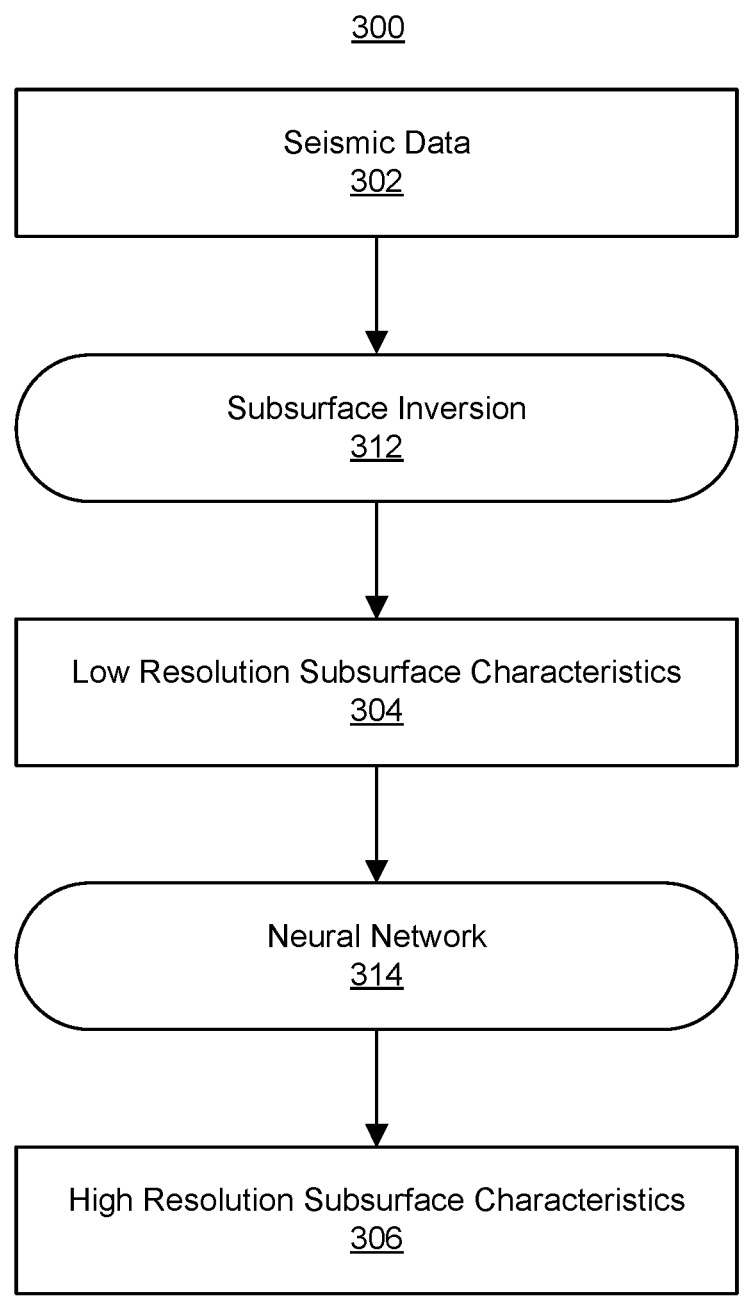
FIG. 3 illustrates an example process for determining high resolution subsurface characteristics

FIG. 3 illustrates an example process 300 for determining high resolution subsurface characteristics. In the process 300, seismic data 300 for a subsurface region may be obtained. The seismic data 300 may be processed using subsurface inversion 312 to obtain low resolution subsurface characteristics 304 in the subsurface region. The low resolution subsurface characteristics 304 in the subsurface region may be fed into a neural network 314, which may output high resolution subsurface characteristics 306. The neural network 314 may predict one sample at a time based on previously generated samples and auxiliary conditions. By leveraging the posterior distribution of samples, the neural network 314 may add the high frequency component to the subsurface characteristics/previously derived earth model by utilizing the information in both the time domain and the frequency domain. For example, frequency changes of the seismic data may be paired with frequency changes of well log data over a particular time interval, with the frequency changes attributes to changes in lithology.

Referring back to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate characterizing subsurface regions. The machine-readable instructions 100 may include one or more computer program components. The machine-readable instructions 100 may include a seismic reflection component 102, a seismic characteristic component 104, an improved seismic characteristic component 106, and/or other computer program components.

The seismic reflection component 102 may be configured to obtain seismic reflection information and/or other information. Obtaining seismic reflection information may include one or more of accessing, acquiring, analyzing, determining, examining, identifying, loading, locating, opening, receiving, retrieving, reviewing, selecting, storing, and/or otherwise obtaining the seismic reflection information. The seismic reflection component 102 may obtain seismic reflection information from one or more locations. For example, the seismic reflection component 102 may obtain seismic reflection information from a storage location, such as the electronic storage 13, electronic storage of a device accessible via a network, and/or other locations. The seismic reflection component 102 may obtain seismic reflection information from one or more hardware components (e.g., a computing device) and/or one or more software components (e.g., software running on a computing device). In some implementations, the seismic reflection information may be obtained from one or more users. For example, a user may interact with a computing device to input the seismic reflection information (e.g., upload the seismic reflection information, identify which seismic reflection response will be used).

The seismic reflection information may define seismic reflection response in a subsurface region. A subsurface region may refer to a part of earth located beneath the surface/located underground. A subsurface region may refer to a part of earth that is not exposed at the surface of the ground. A subsurface region may include a reservoir. A reservoir may refer to a location at which one or more resources are stored. For example, a reservoir may refer to a location at which hydrocarbon are stored. For instance, a reservoir may refer to a location including rocks in which oil and/or natural gas have accumulated. A subsurface region may include one or more subsurface features. A subsurface feature may refer to a distinctive attribute, aspect, and/or element within the subsurface region. A subsurface feature may relate to/be defined by geometry and/or composition of materials within the subsurface region.

Seismic reflection response in a subsurface region may refer to how acoustic waves travel through the subsurface region and/or reflect off one or more subsurface features within the subsurface region. Seismic reflection response in a subsurface region may refer to one or more characteristics of acoustic wave that move through the subsurface region. For example, seismic reflection response in subsurface region may refer to characteristics of the acoustic wave (e.g., velocity, amplitude, frequency) and the time it takes for the acoustic wave to travel down through the subsurface region and reflect back from an interface between different layers in the subsurface region.

The seismic reflection information may define seismic reflection response in a subsurface region by including information that defines one or more content, qualities, attributes, features, and/or other aspects of the seismic reflection response in the subsurface region. For example, the seismic reflection information may define seismic reflection response in a subsurface region by including information that makes up seismic reflection response measured in the subsurface region and/or information that is used to determine the seismic reflection response measured in the subsurface region. Other types of seismic reflection information are contemplated.

The seismic characteristic component 104 may be configured to generate seismic characteristic information and/or other information. The seismic characteristic information may be generated based on subsurface inversion of the seismic reflection information and/or other information. Subsurface inversion (seismic inversion) may refer to a process of transforming seismic data (e.g., seismic reflection information) into a quantitative and/or qualitative material property. For example, subsurface inversion may refer to a process of transforming seismic data into quantitative and/or qualitative properties of rocks in a reservoir. In some implementations, one or more well logs may be used to guide the subsurface inversion. For example, information in the well log(s) may be used to add high frequency below the seismic band and to constrain the inversion. The well log(s) may be conditioned and modified to ensure that a suitable relationship exists between impedance logs and the properties to be inverted. The well log(s) may be converted into time-domain and filtered to the seismic bandwidth. In some implementations, one or more techniques and/or tools may be used to improve the accuracy of the subsurface inversion. For example, seismic attributes may be integrated with deterministic inversion to increase the accuracy of the subsurface inversion.

The seismic characteristic information may refer to subsurface characteristics derived from seismic data. The seismic characteristic information may define subsurface characteristics of the subsurface region. Subsurface characteristics of the subsurface region may refer to attribute, quality, configuration, and/or characteristics of matter within the subsurface region. Subsurface characteristics of the subsurface region may refer to physical arrangement, composition, properties, and/or characteristics of materials (e.g., subsurface elements) within the subsurface region. For example, the subsurface characteristics defined by the seismic characteristic information may include characteristics of rocks in the subsurface region, such as porosity, density, impedance, and/or other characteristics of rocks in the subsurface region. The subsurface characteristics defined by the seismic characteristic information may include characteristics of materials provided by well logs.

The seismic characteristic information may define subsurface characteristics of the subsurface region by including information that defines one or more content, qualities, attributes, features, and/or other aspects of the subsurface characteristics of the subsurface region. For example, the seismic characteristic information may define subsurface characteristics of the subsurface region by including information that makes up subsurface characteristics corresponding to the seismic reflection response and/or information that is used to determine the subsurface characteristics corresponding to the seismic reflection response. Other types of seismic characteristic information are contemplated.

The seismic characteristic information may define subsurface characteristics of the subsurface region at a particular resolution. The resolution at which the subsurface characteristics are defined by correspond to the accuracy of details at which the subsurface characteristics are defined. Higher resolution may result in smaller details of subsurface characteristics being properly defined while lower resolution may result in only larger details of subsurface characteristics being properly defined. For example, the seismic characteristic information generated through subsurface inversion may define subsurface characteristics at a resolution of hundreds of feet. Other resolution of the seismic characteristic information is contemplated.

The improved seismic characteristic component 106 may be configured to generate improved seismic characteristic information and/or other information. The improved seismic characteristic information may be generated based on inputting the seismic characteristic information and/or other information in one or more neural networks. The neural network(s) may take the seismic characteristic information as input. That is, the output of the subsurface inversion may be used as input to the neural network(s). In some implementations, the seismic characteristic information may be modified before being input into the neural network(s). For example, the seismic characteristic information may be prepared for ingestion by the neural network(s).

The neural network(s) may output the improved seismic characteristic information and/or other information. That is, in response to the seismic characteristic information being input into the neural network(s), the neural network(s) may output the improved seismic characteristic information. The improved seismic characteristic information may define the subsurface characteristics of the subsurface region at a higher resolution than the seismic characteristic information. Low-resolution subsurface characteristics obtained from subsurface inversion may be transformed into high-resolution subsurface characteristic by the neural network(s). For example, the subsurface inversion may generate synthetic well logs based on the seismic reflection response from the subsurface region. The synthetic well logs may provide synthetic measurement of physical quantities in the subsurface region that correspond to the seismic reflection response. The neural network(s) may take in the synthetic well logs as input and output higher-resolution well logs.

For example, the seismic characteristic information may define the subsurface characteristics of the subsurface region at hundreds of feet while the improved seismic characteristic information may define the subsurface characteristics of the subsurface region at tens of feet. For instance, the seismic characteristic information may provide information on subsurface features every two-hundred feet while the improved seismic characteristic information may provide information on subsurface features every fifty to seventy feet. Other changes in resolution are contemplated.

The original resolution of the seismic characteristic information may be the dominant frequency of the original subsurface inversion output. The improved resolution of the improved seismic characteristic information may be the higher resolution achieved by improving the dominant seismic frequency. The neural network(s) may integrate frequency domain information from the seismic data and/or well log data into the seismic characteristic information to output the improved seismic characteristic information that has the higher resolution. That is, the neural network(s) may integrate frequency domain information into the subsurface inversion result to improve the resolution of the subsurface inversion result.

In some implementations, the neural network(s) may be/include FFTNet. FFTNet may be a deep learning regression tool for synthesizing audio waveforms. FFTNet may be used on subsurface inversion results to increase the resolution of the subsurface inversion. The FFTNET may utilize both time domain information and frequency domain information to increase resolution of the subsurface characteristics from the subsurface inversion.

In some implementations, the neural network(s) (e.g., FFTNet) may be trained using inversion data, well log, and/or other information. The inversion data may refer to results of inversion (low-resolution inversion output) and the well log may refer to measurements of subsurface characteristics for which inversion is desired. The inversion data may be used as example inputs while the well log may be used as example outputs. The inversion data and the well log may be paired for training of the neural network(s) based on location and/or other information. That is, inversion data for a particular subsurface location may be paired with well log for the same subsurface location. In some implementations, the training data may be scaled before being used to train the neural network(s). For example, the well log may be scaled to a desired dimension (e.g., scaled to 50-75 feet) before the well log is used to train the neural network(s). Similarly, the input to the trained neural network(s) may be scaled to a desired dimension.

Figure 4:
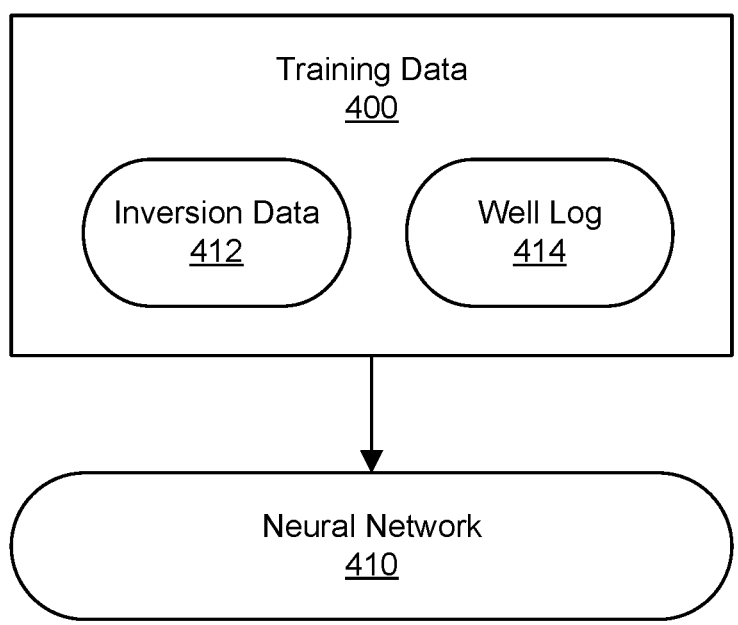
FIG. 4 illustrates an example training of a neural network.

FIG. 4 illustrates an example training of a neural network. As shown in FIG. 4, training data for a neural network 410 may include inversion data 412 and well log 414. By paring the inversion data 412 with the well log 414, the neural network 410 may be trained to output higher-resolution well log data when lower-resolution inversion data is provided as input.

In some implementations, the subsurface region may be modeled based on the improved seismic characteristic information and/or other information. For example, static and/or dynamic properties of the subsurface region may be modeled using the improved seismic characteristic information. For instance, the improved seismic characteristic information may be used as input parameters to simulate materials within the subsurface region at one or more moments in time. The improved seismic characteristic information may be used as input parameters to simulate how the material within the subsurface region changes with time and/or with operation of one or more wells.

In some implementations, geometry of the subsurface region may be determined based on the improved seismic characteristic information and/or other information. Geometry of the subsurface region may refer to shape and/or relative arrangement of material within the subsurface region. In some implementations, the geometry of the subsurface region may be determined deterministically based on the improved seismic characteristic information. The higher-resolution version of the subsurface inversion result may be used to deterministically, rather than probabilistically, determine the geometry of the subsurface region.

For example, the subsurface region may include a reservoir, and the geometry of the reservoir determined (e.g., identified, classified, located) based on the improved seismic characteristic information may include top, base, and size of the reservoir. As another example, the geometry of the reservoir determined based on the improved seismic characteristic information may include layer types (e.g., sand layers vs shale layers) and layer locations (e.g., boundaries of layers) within the reservoir. As yet another example, the geometry of the reservoir determined based on the improved seismic characteristic information may include flow barriers or baffles, such as faults, in addition to fluid or lithology changes within the reservoir. Thus, in addition to the external structure/boundary of the reservoir, the internal structure of the reservoir may be determined using the improved seismic characteristic information. Other uses of the improved seismic characteristic information are contemplated.

Figure 5:
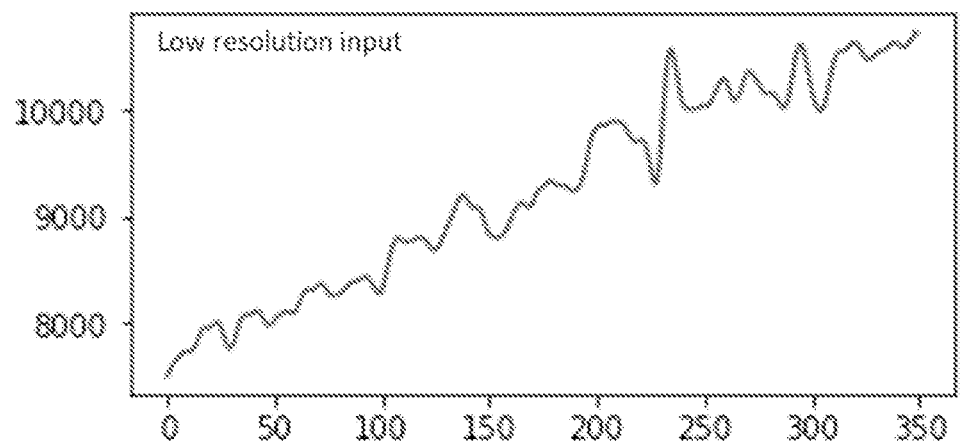
FIG. 5 illustrates an example increase in resolution of subsurface inversion.
Figure 5:
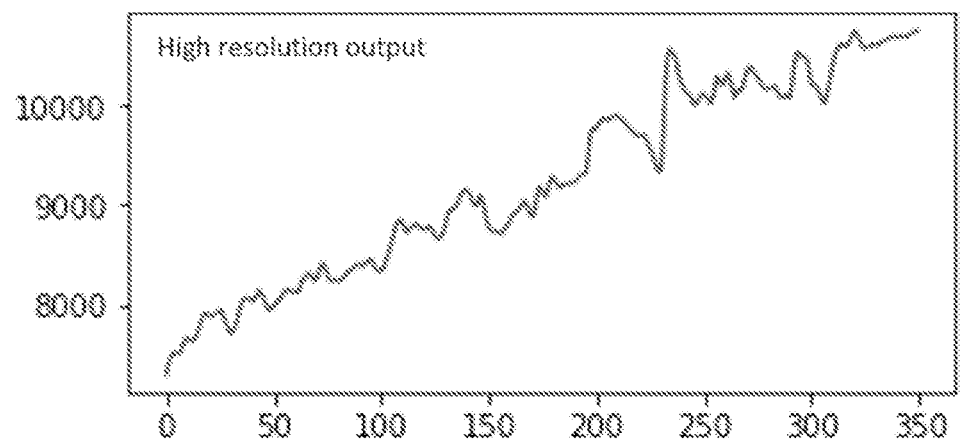

FIG. 5 illustrates an example increase in resolution of subsurface inversion. Low resolution subsurface characteristics 500 (e.g., low resolution inversion result) may be processed through the neural network to obtain high resolution subsurface characteristics 550. Low resolution of the input to the neural network may be indicated by the smoothness of the curve that define the low resolution subsurface characteristics 500. The increased (higher) resolution of the output may be indicated by the jaggedness of the curve that define the high resolution subsurface characteristics 550. For example, the low resolution subsurface characteristics 500 may include low resolution P-impedance at different depths of the subsurface region. The low resolution P-impedance at different depths may be obtained using subsurface inversion. The high resolution subsurface characteristics 550 may include high resolution P-impedance at different depths of the subsurface region. The low resolution P-impedance data may be input into the neural network, and the neural network may output the high resolution P-impedance data. Improving the resolution of other types of data is contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the display 14 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11, the electronic storage 13, and the display 14 are shown in FIG. 1 as single entities, this is for illustrative purposes only. One or more of the components of the system 10 may be contained within a single device or across multiple devices. For instance, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
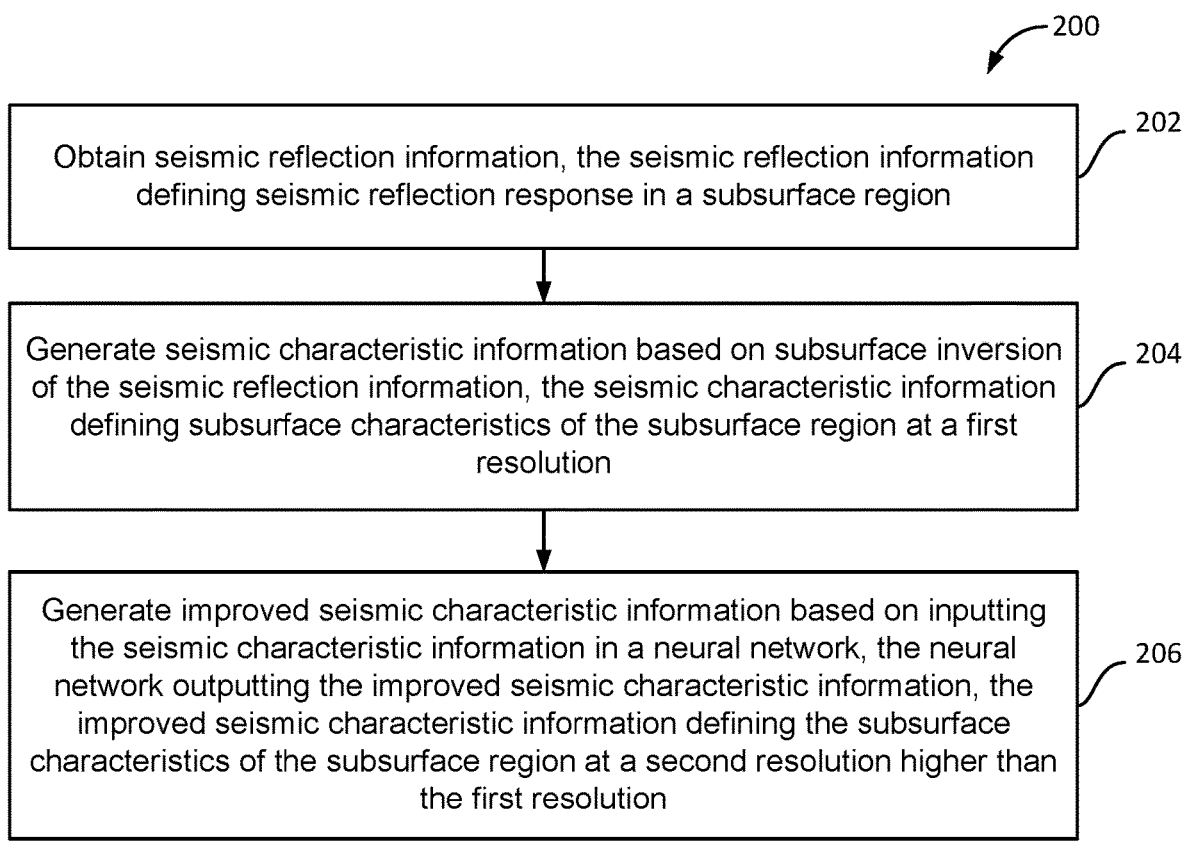
FIG. 2 illustrates an example method for improving resolution of subsurface inversion.

FIG. 2 illustrates method 200 for improving resolution of subsurface inversion. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, seismic reflection information and/or other information may be obtained. The seismic reflection information may define seismic reflection response in a subsurface region. In some implementation, operation 202 may be performed by a processor component the same as or similar to the seismic reflection component 102 (Shown in FIG. 1 and described herein).

At operation 204, seismic characteristic information may be generated based on subsurface inversion of the seismic reflection information and/or other information. The seismic characteristic information may define subsurface characteristics of the subsurface region at a first resolution. In some implementation, operation 204 may be performed by a processor component the same as or similar to the seismic characteristic component 104 (Shown in FIG. 1 and described herein).

At operation 206, improved seismic characteristic information may be generated based on inputting the seismic characteristic information in a neural network and/or other information. The neural network may output the improved seismic characteristic information. The improved seismic characteristic information may define the subsurface characteristics of the subsurface region at a second resolution higher than the first resolution. In some implementation, operation 206 may be performed by a processor component the same as or similar to the improved seismic characteristic component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for increasing resolution of subsurface inversion, the system comprising:
   one or more physical processors configured by machine-readable instructions to:
      obtain seismic reflection information, the seismic reflection information defining seismic reflection response in a subsurface region;
      generate seismic characteristic information based on subsurface inversion of the seismic reflection information, the seismic characteristic information defining subsurface characteristics of the subsurface region at a first resolution, wherein the subsurface inversion of the seismic reflection information utilizes information in a time-domain but ignores information in a frequency domain, which results in the seismic characteristic information defining the subsurface characteristics of the subsurface region at a first resolution, wherein a given subsurface characteristic of the subsurface region is invisible within the seismic characteristic information due to the subsurface inversion being performed in the time-domain; and
      generate improved seismic characteristic information using a neural network, the neural network trained using pairs of lower resolution subsurface inversion data and higher resolution well log to utilize both the information in the time-domain and the information in the frequency domain to increase resolution of input subsurface characteristics, wherein based on the seismic characteristic information being input to the neural network, the neural network outputs the improved seismic characteristic information, the improved seismic characteristic information defining the subsurface characteristics of the subsurface region at a second resolution higher than the first resolution, wherein inclusion of the information in the frequency domain in generating the improved seismic characteristic information reveals the given subsurface characteristic of the subsurface region in the improved seismic characteristic information.

2. The system of claim 1, wherein:
the subsurface region includes a reservoir;
the given subsurface characteristic of the subsurface region that is invisible within the seismic characteristic information due to the subsurface inversion being performed in the time-domain includes top of the reservoir; and
the inclusion of the information in the frequency domain in generating the improved seismic characteristic information reveals the top of the reservoir in the improved seismic characteristic information.

3. The system of claim 1, wherein the improved seismic characteristic information having the second resolution higher than the first resolution of the seismic characteristic information includes:
the seismic characteristic information defining the subsurface characteristics of the subsurface region at hundreds of feet; and
the improved seismic characteristic information defining the subsurface characteristics of the subsurface region at tens of feet.

4. The system of claim 1, wherein geometry of the subsurface region is determined based on the improved seismic characteristic information.

5. The system of claim 4, wherein:
the subsurface region includes a reservoir; and
the geometry of the reservoir determined based on the improved seismic characteristic information includes top, base, and size of the reservoir.

6. The system of claim 5, wherein the geometry of the reservoir determined based on the improved seismic characteristic information further includes layer types and layer locations within the reservoir.

7. The system of claim 4, wherein the geometry of the subsurface region is determined deterministically based on the improved seismic characteristic information.

8. The system of claim 1, wherein the neural network is Fast Fourier Transform Network (FFTNet).

9. The system of claim 8, wherein the lower resolution subsurface inversion data and the higher resolution well log are paired for training of the FFTNet based on location.

10. A method for increasing resolution of subsurface inversion, the method comprising:
obtaining seismic reflection information, the seismic reflection information defining seismic reflection response in a subsurface region;
generating seismic characteristic information based on subsurface inversion of the seismic reflection information, the seismic characteristic information defining subsurface characteristics of the subsurface region at a first resolution, wherein the subsurface inversion of the seismic reflection information utilizes information in a time-domain but ignores information in a frequency domain, which results in the seismic characteristic information defining the subsurface characteristics of the subsurface region at a first resolution, wherein a given subsurface characteristic of the subsurface region is invisible within the seismic characteristic information due to the subsurface inversion being performed in the time-domain; and
generating improved seismic characteristic information using a neural network, the neural network trained using pairs of lower resolution subsurface inversion data and higher resolution well log to utilize both the information in the time-domain and the information in the frequency domain to increase resolution of input subsurface characteristics, wherein based on the seismic characteristic information being input to the neural network, the neural network outputs the improved seismic characteristic information, the improved seismic characteristic information defining the subsurface characteristics of the subsurface region at a second resolution higher than the first resolution, wherein inclusion of the information in the frequency domain in generating the improved seismic characteristic information reveals the given subsurface characteristic of the subsurface region in the improved seismic characteristic information.

11. The method of claim 10, wherein:
the subsurface region includes a reservoir;
the given subsurface characteristic of the subsurface region that is invisible within the seismic characteristic information due to the subsurface inversion being performed in the time-domain includes top of the reservoir; and
the inclusion of the information in the frequency domain in generating the improved seismic characteristic information reveals the top of the reservoir in the improved seismic characteristic information.

12. The method of claim 10, wherein the improved seismic characteristic information having the second resolution higher than the first resolution of the seismic characteristic information includes:
the seismic characteristic information defining the subsurface characteristics of the subsurface region at hundreds of feet; and
the improved seismic characteristic information defining the subsurface characteristics of the subsurface region at tens of feet.

13. The method of claim 10, wherein geometry of the subsurface region is determined based on the improved seismic characteristic information.

14. The method of claim 13, wherein:
the subsurface region includes a reservoir; and
the geometry of the reservoir determined based on the improved seismic characteristic information includes top, base, and size of the reservoir.

15. The method of claim 14, wherein the geometry of the reservoir determined based on the improved seismic characteristic information further includes layer types and layer locations within the reservoir.

16. The method of claim 13, wherein the geometry of the subsurface region is determined deterministically based on the improved seismic characteristic information.

17. The method of claim 10, wherein the neural network is Fast Fourier Transform Network (FFTNet).

18. The method of claim 17, wherein the lower resolution subsurface inversion data and the higher resolution well log are paired for training of the FFTNet based on location.

* * * * *